United States Patent [19]

Ramlow et al.

[11] 4,334,049

[45] Jun. 8, 1982

[54] PROCESS FOR THE PREPARATION OF FINELY DIVIDED SOLID POLYMERS IN POLYOL

[75] Inventors: Gerhard G. Ramlow, Grosse Ile; Duane A. Heyman, Monroe; Richard A. Moore, Trenton, all of Mich.

[73] Assignee: BASF Wyandotte Corporation, Wyandotte, Mich.

[21] Appl. No.: 179,136

[22] Filed: Aug. 18, 1980

[51] Int. Cl.$^3$ ............................................. C08F 2/00
[52] U.S. Cl. ................................... 526/202; 526/210; 526/218; 526/219; 526/910; 525/383; 526/201
[58] Field of Search .............. 526/202, 210, 910, 218, 526/219, 201; 525/383; 260/30.8 DS, 32.4, 32.6 R, 32.8 R, 33.2 R, 33.4 R, 33.6

[56] References Cited

U.S. PATENT DOCUMENTS

| | | | |
|---|---|---|---|
| 3,317,635 | 5/1967 | Osmond | 525/292 |
| 3,514,500 | 5/1970 | Osmond et al. | 526/202 |
| 3,823,201 | 7/1974 | Pizini et al. | 260/33.4 R |
| 3,935,155 | 1/1976 | Osmond et al. | 260/33.4 R |
| 3,940,361 | 2/1976 | Sommerfeld | 260/33.4 R |
| 4,014,846 | 3/1977 | Ramlow et al. | 260/33.2 R |
| 4,059,557 | 11/1977 | Bentley et al. | 260/33.4 R |
| 4,161,468 | 7/1979 | Davis et al. | 260/33.4 R |

*Primary Examiner*—Joseph L. Schofer
*Assistant Examiner*—Bernard Lipman
*Attorney, Agent, or Firm*—Norbert M. Lisicki

[57] ABSTRACT

Finely-divided polymeric solids are prepared by free-radical polymerization on ethylenically unsaturated monomer or monomers in an organic solvent employing an alkylene oxide adduct of a styrene-allyl alcohol copolymer stabilizer.

11 Claims, No Drawings

PROCESS FOR THE PREPARATION OF FINELY DIVIDED SOLID POLYMERS IN POLYOL

BACKGROUND OF THE INVENTION

1. Field of the Invention

The present invention relates to finely-divided polymeric solids having particle sizes from about 0.1 to 10 microns dispersed in a polyol. More particularly, the invention relates to finely-divided solid polymers prepared by polymerizing in the presence of a free-radical initiator and an organic solvent, an ethylenically unsaturated monomer or mixture of monomers, in the presence of an effective amount of a preformed polymeric stabilizer. The solid polymers, when dispersed in a polyol, are useful in the preparation of polyurethane foams.

2. Description of the Prior Art

The prior art, as evidenced by U.S. Pat. Nos. 3,652,659; 3,875,258; 3,950,317; 3,931,092; and Reissue Patent Nos. 28,715 and 29,014 teach the preparation of graft polymer dispersions which are useful in the preparation of polyurethanes by the polymerization of ethylenically-unsaturated monomers. These patents disclose various methods of preparing graft polymer dispersions generally in the presence of polyols. German Patent Application No. 2,756,601 discloses the use of a stabilizer which consists of a polymer of an ethylenically unsaturated monomer or mixture of such monomers which is chemically bound to a propylene oxide polymer having a number average molecular weight of at least about 800 and having a viscosity of more than about 40,000 cps at 25° C. Applicants are unaware of any prior art which relates to the finely-divided solid polymers of the type described herein prepared by polymerization in the presence of the claimed preformed polymeric stabilizer consisting of an alkoxylated styrene-allyl alcohol polymer.

SUMMARY OF THE INVENTION

In accordance with the present invention, finely-divided polymer solids are prepared by polymerizing in the presence of a free-radical initiator and an organic solvent an ethylenically-unsaturated monomer or mixtures of monomers by an improved process wherein said polymerization is conducted in the presence of an effective amount of a preformed polymeric stabilizer. The preformed polymeric stabilizer is an alkylene oxide adduct of a copolymer of styrene-allyl alcohol. The polymer solids are thereupon dispersed in a polyol. These dispersions are then employed for the preparation of polyurethane foams.

DESCRIPTION OF THE PREFERRED EMBODIMENTS

In accordance with the present invention, finely-divided solid polymer is prepared by polymerizing in the presence of a free-radical initiator, and an organic solvent, an ethylenically-unsaturated monomer or mixture of monomers, by an improved procedure which comprises conducting the polymerization in the presence of an effective amount of a preformed polymeric stabilizer. The concentration of the preformed polymeric stabilizer, which is employed, is at least or greater than 10 percent based on the weight of the added monomers. The preformed polymeric stabilizer is incorporated into the reaction flask in the presence of a solvent, a free-radical initiator, and the monomer or mixture of monomers.

The preformed polymeric stabilizer is an alkylene oxide adduct of a copolymer of styrene-allyl alcohol. The copolymer contains from about 15 weight percent to about 85 weight percent styrene, and has an equivalent weight of 58 to 4000. The alkoxylated stabilizer has an equivalent weight of 220 to 8000 and a viscosity ranging from about 2000 to 4000 centipoises at 25° C. As is well known to those skilled in the art, these copolymers may be prepared with, or in the absence of, polymerization initiators. The copolymer is then reacted with alkylene oxides. The alkylene oxides which may be employed include ethylene oxide, propylene oxide, butylene oxide and mixtures thereof.

The stabilizers of the instant invention were prepared by the following general procedure:

Five parts of toluene and 5 parts of styrene-allyl alcohol copolymer having an equivalent weight of 300 and a hydroxyl content of 5.7 percent were charged to a reaction flask equipped with a stirrer, thermometer, and water-cooled condenser. Upon heating the mixture to about 90° C., 44 parts of 45 percent KOH were added, and water was azeotroped off. To the reaction was added 2340 parts of propylene oxide maintaining the temperature of the reaction between 90°–100° C. After addition of the propylene oxide was completed, the reaction mixture was refluxed for 4 to 5 hours. The product was then treated with adsorbent to remove the KOH and stripped for 1 hour at 105° C. at less than 10 millimeters Hg pressure.

The concentration of the preformed polymeric stabilizer which is employed may vary from 10:1 to 1:1 monomer:stabilizer ratio. The polymerization of ethylenically unsaturated monomer or monomers may be carried out at a temperature between 50° C. and 170° C., preferably between 80° C. to 100° C. The preformed polymeric stabilizer is incorporated in the solvent that is initially added to the reaction, upon which the monomer and catalyst are added to the reaction vessel. This polyol may or may not contain unsaturation within the molecule. The advantages of employing the process of the instant invention are that the finely-divided solid polymers may be prepared (1) at low temperatures, that is, at about 80° C., (2) only about one-half of the free-radical initiator normally required, is required, (3) high solids contents >30% when dispersed in polyol have relatively low viscosities, and (4) these dispersions may be prepared employing a wide variety of polyols.

Representative ethylenically unsaturated monomers which may be employed in the present invention include butadiene, isoprene, 1,4-pentadiene, 1,5-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl-4-vinylbenzoate, phenoxystyrene, p-vinyldiphenyl sulfide, p-vinylphenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis(beta-chloroethyl) vinylphosphonate, vinyl phenyl ketone, vinyl ethyl sulfide, vinyl ethyl sulfone, N-methyl-N-vinylacetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene, methyl methacrylate and mixtures thereof.

The amount of ethylenically unsaturated monomer employed in the polymerization reaction is generally from one percent to 80 percent, preferably from 30 percent to 50 percent, based on the total weight of the reaction mixture. The polymerization occurs at a temperature between about 25° C. and 170° C., preferably from 80° C. to 100° C.

The finely-divided polymer prepared from the ethylenically unsaturated monomer or monomers may be dispersed in polyls in a concentration ranging from 1 to 95 weight percent based on the weight of polyol, preferably from 55 to 95 weight percent.

Illustrative initiators which may be employed are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, bis(triphenylmethyl)peroxide, bis(p-methoxybenzoyl)peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha-alpha'-azo-2-methyl butyronitrile, alpha,alpha'-azo-2-methyl heptonitrile, 1,1'-azo-1-cyclohexane carbonitrile, dimethyl alpha,alpha'-azoisobutyrate, 4,4'-azo-4-cyanopentanoic acid, azobis-(isobutyronitrile), 1-t-amylazo-1-cyanocyclohexane, persuccinic acid, diisopropyl peroxy dicarbonate, 2-t-butylazo-2-cyano-4-methylpentane, and the like; a mixture of catalysts may also be used. Azobis(isobutyronitrile) and 2-t-butylazo-2-cyano-4-methylpentane are the preferred catalysts. Generally, from about 0.5 percent to about 10 percent, preferably from about 1 percent to about 4 percent, by weight of catalyst based on the weight of the monomer will be employed in the process of the invention.

To be useful in the present invention, the solvent employed preferably has a boiling point of from 20° C. to 250° C. at ambient pressure. Representative organic solvents which may be employed in the preparation of the polymeric solids include aliphatic, alicyclic and aromatic hydrocarbons, alcohols, esters, ketones, amides, amines, ethers, nitriles, sulfoxides and the corresponding nitro- and halo-substituted derivatives thereof. These include pentane, hexane, heptane, nonane, undecane, dodecane, petroleum ether, methanol, ethanol, isopropanol, butanol, benzyl alcohol, acetone, propanone, methylethylketone, ethylbutylketone, acetophenone, benzyl, naphthalene, toluene, 1,2,4-trimethylbenzene, ethylacetate, isopropylacetate, butylacetate, carbon tetrachloride, chloroform, chlorobenzene, trichloroethylene, 1,1,1-trichloro-2,2,2-trifluoroethane, trifluorochloromethane, dimethylformamide, dimethylsulfoxide, tetrahydrofuran, bis(2-methoxyethylether), benzonitrile, 2-nitropropane, nitrobenzene and acetonitrile. Mixtures of the above solvents may also be employed. The particular solvent employed is not critical to the process of the invention. The preferred solvents are the aliphatic alcohols having from one to four carbon atoms such as methanol, ethanol, propanol, isopropanol, and the various butanols.

As previously mentioned are the finely divided polymer solid is dispersed in a liquid polyol. Representative polyols as dispersing media which may be employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557.

Representative polyols include polyhydroxyl-containing polyesters, polyalkylene polyether polols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alphy-hydromuconic acid, beta-hydromuconic acid, alpha-butyl-alpha-ethylglutaric acid, alpha,beta-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, alpha-methyl glucoside, pentaerythritol, and sorbitol. Also included within the term "polyhydric alcohol" are compounds derived from phenol such as 2,2'-bis(4,4'-hydroxyphenyl)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)-propane and blends thereof having equivalent weights of from 100 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkynethiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing esters groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The polyurethane foams employed in the present invention are generally prepared by the reaction of a polyol having dispersed therein the finely divided solid polymers with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellulose polyurethane plastics are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-tolylene diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyldiphenylmethane-2,2'-5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the graft polymer and copolymer dispersions may be employed along with another polyhydroxyl-containing component commonly employed in the art. Any of the polyhydroxyl-containing components which are described above for use in the preparation of the graft polymer and copolymer dispersions may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine, 1,4-cyclohexane-bis-(methylamine), ethylene diamine, diethylene triamine, N-(2-hydroxypropyl)ethylene diamine, N,N'-di(2-hydroxypropyl)ethylene diamine, piperazine, 2-methylpiperazine, and morpholine.

Any suitable catalyst may be used including tertiary amines such as, for example, triethylene diamine, N-methyl morpholine, N-ethyl morpholine, diethyl ethanolamine, N-cocomorpholine, 1-methyl-4-dimethylamino ethyl piperazine, 3-methoxy-N-dimethyl propyl amine, N-dimethyl-N'-methyl isopropyl propylene diamine, N,N'-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surfactants have been found satisfactory. Nonionic surfactants are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane foam were determined by the following ASTM tests:

Tensile strength D-412
Elongation D-412
Block tear D-470
Compression load D-1654
Compression set D-1395

In these examples the composition of the stabilizer and the polyols as designated by the letters A, B, etc., are as follows.

Stabilizer A is a propylene oxide adduct of a copolymer of styrene-allyl alcohol with an equivalent weight of 220 and a hydroxyl content of 7.7 percent, the stabilizer equivalent weight being 1000.

Stabilizer B is a propylene oxide adduct of a copolymer of styrene-allyl alcohol with an equivalent weight of 300 and a hydroxyl content of 5.7 percent, the stabilizer equivalent weight being 2800.

Stabilize C is a propylene oxide adduct of a copolymer of styrene-allyl alcohol with an equivalent weight of 220 and a hydroxyl content of 7.7 percent, the stabilizer equivalent weight being 2100.

Stabilizer D is a propylene oxide ethylene oxide adduct of a copolymer of styrene-allyl alcohol with an equivalent weight of 220 and a hydroxyl content of 7.7 percent, the ratio of propylene oxide to ethylene oxide is 2 to 1 and the stabilizer equivalent weight is 1200.

Polyol A is a propylene oxide adduct of glycerine having an equivalent weight of 1000.

Polyol B is an ethylene oxide propylene oxide adduct of glycerine having an equivalent weight of about 1000 and containing 9 percent ethylene oxide.

Polyol C is an ethylene oxide propylene oxide adduct of glycerine having an equivalent weight of 830 and containing 6 percent ethylene oxide.

EXAMPLE 1

A one-liter, four-necked flask fitted with a stirrer, water cooled condenser, nitrogen inlet and thermowell was charged with 170 parts isopropanol, 30 parts Stabilizer A, 100 parts styrene, 100 parts of acrylonitrile, and 2.0 parts of 2,2'-azobisisobutyronitrile. The reaction mixture was heated to 80° C. and allowed to react for three hours. At the end of the reaction period 270 parts of Polyol A was added to the isopropanol dispersion. Volatiles of isopropanol and unreacted monomer were removed at 100° C. and less than 1 millimeter of mercury pressure. The product collected had a Brookfield viscosity of 3080 centipoises at 25° C.

EXAMPLES 2–11

Examples 2–11 were prepared in a manner similar to that of example 1 with the exception that other stabilizers and polyols were employed.

TABLE I

| Example | Stabilizer/parts | Isopropanol/parts | Styrene/parts | Acrylonitrile/parts | Viscosity cps @ 25° C. |
|---|---|---|---|---|---|
| 2 | A/50 | 30 | 85 | 85 | 2985 |
| 3 | B/50 | 300 | 85 | 85 | 3155 |
| 4 | C/50 | 300 | 85 | 85 | 2910 |
| 5 | — | 300 | 85 | 85 | Coagulated |
| 6 | */50 | 300 | 85 | 85 | Coagulated. |
| 7 | A/50 | 250 | 85 | 85 | 2950 |
| 8 | A/25 | 175 | 100 | 100 | 3350 |
| 9 | A/40 | 170 | 100 | 100 | 3080 |
| 10 | A/30 | 170 | 100 | 100 | Solid |
| 11 | D/53 | 304 | 80.5 | 80.5 | 2665 |
| 12 | D/56 | 302 | 86 | 86 | Solid |

*Polyol B was employed in Example 6 instead of any stabilizer.
Examples 10 and 12 did not have Polyol A added to the reaction mixture prior to removal of the volatiles.

EXAMPLES 13–15

Using a one-quart capacity cylindrical container equipped with the Lightning Model V-7 mixer fitted with a shrouded blade, the indicated amounts of polyol, water, catalyst and silicone surfactant was added to the container. The mixture was stirred for about 30 seconds, allowed to set for about 15 seconds and stirring was resumed. After about 60 seconds elapsed time, the polyisocyanate was added to the container and the resulting mixture was stirred for about 4 to 5 seconds. The contents of the container were then immediately poured into cardboard cake boxes and the foams were allowed to rise therein. After foam rise was completed, the resulting foams were oven cured for about 5–8 minutes. The following table, Table II, sets forth the ingredients and amounts that were used to prepare the foams as well as the physical properties of the foams. Good physical properties of the foams were obtained.

TABLE II

| Example | 13 | 14 | 15 |
|---|---|---|---|
| Ingredients | | | |
| Dispersion of Ex. 4, parts | 300 | 0 | 0 |
| Dispersion of Ex. 7, parts | 0 | 300 | 0 |
| Dispersion of Ex. 2, parts | 0 | 0 | 231.4 |
| Polyol A, parts | 0 | 0 | 68.6 |
| Distilled water, parts | 9.0 | — | — |
| Triethylenediamine | 0.2 | — | — |
| Silicone surfactant, parts | 3.0 | — | — |
| Dibutyltin dilaurate, parts | 0.4 | 0.4 | 0.6 |
| TDI, 80/20 (105 index), parts | 106.9 | 109.0 | 111.3 |
| Physical Properties | | | |
| Rise time, sec. | 102 | 96 | 90 |
| Density, pcf. | 1.99 | 1.91 | 1.93 |
| Tensile strength, psi. | 16.9 | 15.2 | 15.8 |
| Elongation, % | 60 | 50 | 63 |
| Block tear, pi. | 0.7 | 0.5 | 0.7 |
| CLD, psi. | | | |
| 50% defl. | 1.78 | 1.92 | 1.48 |
| CLD, psi. (humid aged) | | | |
| 50% defl. | 1.25 | 1.53 | 1.12 |
| Compression set, % | | | |
| 50% | 5.1 | 6.4 | 4.4 |
| 90% | 7.8 | 6.9 | 6.4 |
| Compression set, % (humid aged) | | | |
| 50% | 6.5 | 6.7 | 3.9 |
| 90% | 11.8 | 10.2 | 9.3 |
| Air flow, cfm. | 1.62 | 0.36 | 0.46 |

The embodiments of the invention in which an exclusive privilege or property is claimed are as follows:

1. In a process for the preparation of a finely divided solid polymer prepared by polymerizing in the presence of a free-radical initiator, and an organic solvent, an ethylenically unsaturated monomer or mixture of monomers, the improvement comprises, conducting said polymerization in the presence of an effective amount of a preformed polymeric stabilizer wherein said stabilizer consists of an alkylene oxide adduct of a copolymer of styrene-allyl alcohol, said stabilizer having an equivalent weight of 220 to 8000.

2. The process of claim 1 wherein the monomer is selected from the group consisting of acrylonitrile, styrene, methyl methacrylate and mixtures thereof.

3. The process of claim 1 wherein the monomer is acrylonitrile.

4. The process of claim 1 wherein the monomer is styrene.

5. The process of claim 1 wherein the monomer is methyl methacrylate.

6. The process of claim 1 wherein the free radical initiator is azobis(isobutyronitrile).

7. The process of claim 1 wherein the free radical initiator is 2-t-butylazo-2-cyano-4-methylpentane.

8. The process of claim 1 wherein said copolymer contains from 15 weight percent to 85 weight percent styrene, and an equivalent weight range from 58 to 4000.

9. The process of claim 1 wherein the alkylene oxide is selected from the group consisting of ethylene oxide, propylene oxide and butylene oxide.

10. The process of claim 1 wherein the concentration of ethylenically unsaturated monomer is from one to 50 weight percent based on the total weight of the product.

11. The process of claim 1 wherein the stabilizer is employed in a 10:1 to 1:1 monomer:stabilizer ratio.

* * * * *